United States Patent [19]

Daunt et al.

[11] 4,377,736
[45] Mar. 22, 1983

[54] METHOD AND APPARATUS FOR REMOVING MATERIAL FROM A SURFACE

[75] Inventors: John E. Daunt; John P. Tipton; John E. Adair, all of Albuquerque, N. Mex.

[73] Assignee: General Electric Company, Cincinnati, Ohio

[21] Appl. No.: 292,856

[22] Filed: Aug. 14, 1981

[51] Int. Cl.³ ............................................. B23K 27/00
[52] U.S. Cl. ...................... 219/121 LH; 219/121 LJ; 219/121 LS; 219/121 LX; 219/121 LZ
[58] Field of Search .................. 219/121 LH, 121 LJ, 219/121 LK, 121 LL, 121 LS, 121 LT, 121 LU, 121 LX, 121 LY, 121 LZ

[56] References Cited

U.S. PATENT DOCUMENTS

| | | | |
|---|---|---|---|
| 3,192,318 | 6/1965 | Schleich et al. | 219/121 LZ |
| 3,265,855 | 8/1966 | Norton | 219/121 LK |
| 3,398,237 | 8/1968 | Paidosh | 219/121 EJ X |
| 3,404,254 | 10/1968 | Jones | 219/121 EJ |
| 3,636,251 | 1/1972 | Daly et al. | 219/121 LH X |
| 3,689,159 | 9/1972 | Taniguchi et al. | 219/121 LX X |
| 4,092,515 | 5/1978 | Joslin et al. | 219/121 LM |
| 4,131,782 | 12/1978 | Einstein et al. | 219/121 LL |
| 4,200,382 | 4/1980 | Friedman | 219/121 L X |
| 4,322,600 | 3/1982 | Crahay | 219/121 FS X |

*Primary Examiner*—C. L. Albritton
*Attorney, Agent, or Firm*—Lee H. Sachs; Derek P. Lawrence

[57] ABSTRACT

The relative position of a plurality of holes through a surface of a member, the holes having been generated by high energy means, such as a laser, which vaporizes material of the member to produce a light flash, is inspected and controlled as the holes are being generated using a light sensing means which is responsive to the light flash and which observes the relative positions of the holes being produced. The light sensing means signals a hole pattern comparison means which compares the actual hole pattern with a preselected hole pattern. Adjustment can then be made to reposition the high energy beam if required to correct undesirable error in the actual hole pattern during generation of the holes.

8 Claims, 2 Drawing Figures

U.S. Patent    Mar. 22, 1983    4,377,736
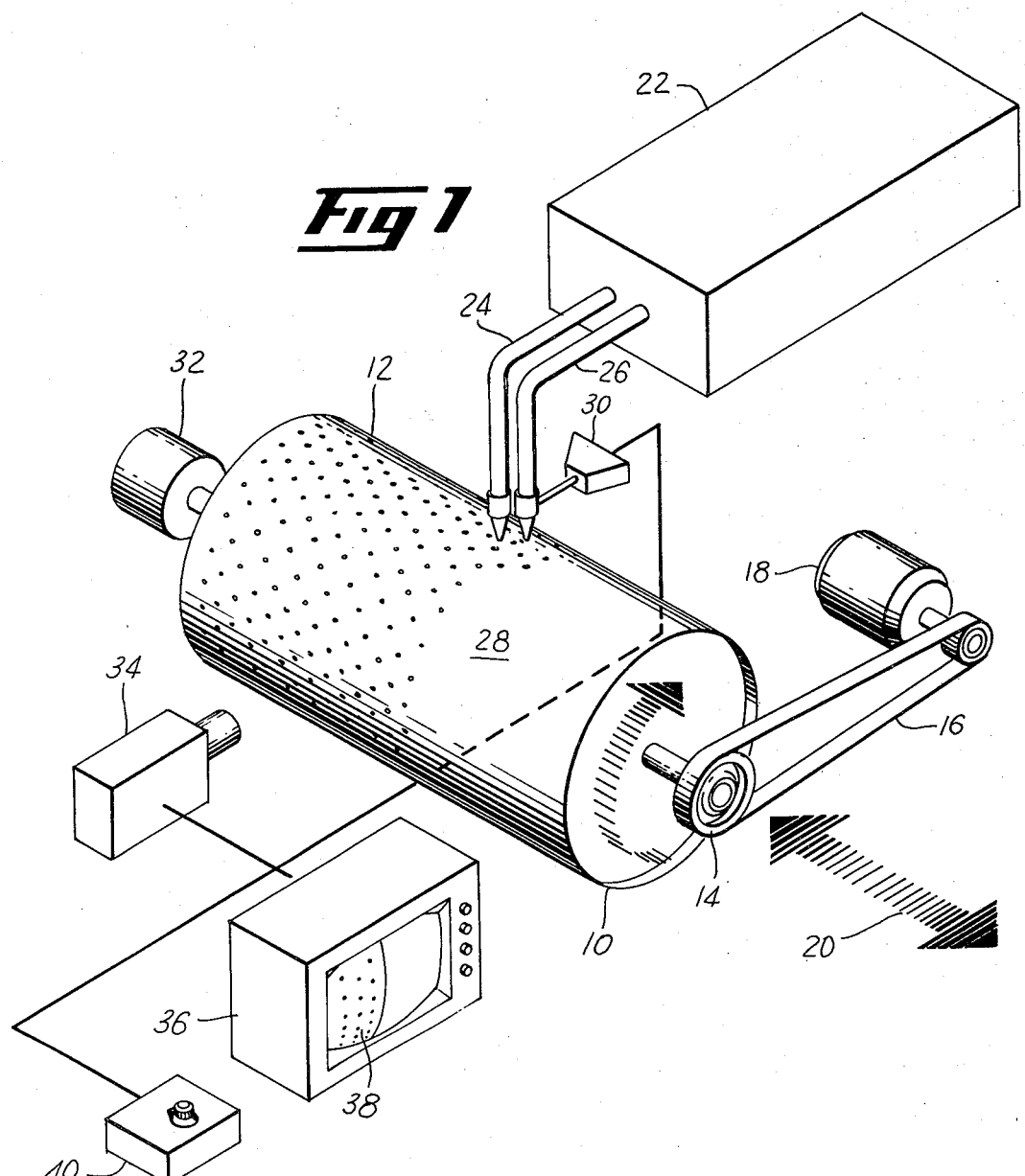
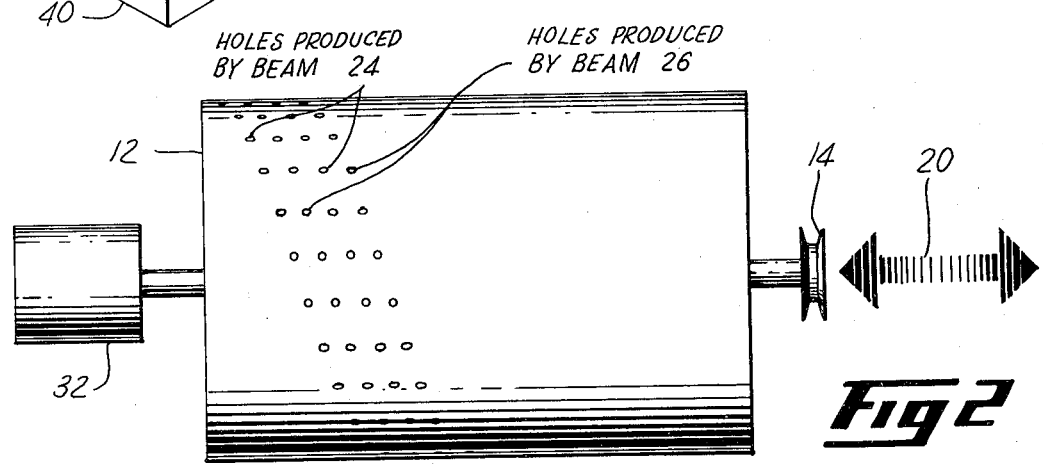

METHOD AND APPARATUS FOR REMOVING MATERIAL FROM A SURFACE

BACKGROUND OF THE INVENTION

1. Field of the Invention

This invention relates to material removal from a member surface, and more particularly to a method and apparatus for making, inspecting and controlling the position of small holes in a surface of a member, such as a sheet or panel member.

2. Description of the Prior Art

More sophisticated sound attenuation members, for example sound suppression panels for use in gas turbine engines include one or more components in which specifically sized, shaped and spaced openings are disposed. Such openings can be perforations, slots, etc. U.S. Pat. No. 3,542,152-Adamson et al., issued Nov. 24, 1970; U.S. Pat. No. 3,819,008-Evans et al., issued June 25, 1974; and U.S. Pat. No. 4,130,175-Hehmann, issued Dec. 19, 1978, all assigned to the assignee of this invention, show examples of such members. Frequently, such arrangements include one or more sheet members for example at one face or within the structure or both, with a plurality of holes, slots, etc. of a particular size and arrangement selected to cooperate with other portions of the panel to attenuate predetermined sound waves. One such perforated, reinforced plastic sheet member is described in U.S. Pat. No. 3,704,194-Harrier, patented Nov. 28, 1972; another is shown in U.S. Pat. No. 3,787,546-Pratt et al., issued Jan. 22, 1974, all assigned to the assignee of this invention. As shown by these references, sheets of reinforced plastic have been perforated by pressing the sheet over a mandrel. Other means for perforating such members includes mechanical drilling and the use of high energy sources such as electron beam and laser.

The manufacture of such perforated sheets including very small, closely spaced holes of a uniform preselected pattern has been difficult and costly: electron beam drilling when used with fiberglass reinforced plastic laminated sheet has been seen to oxidize the plastic binder, such as epoxy resin, to the extent that the material is no longer functional as a laminate. A laser has been used to drill holes in various materials. However, because of slight variations in the consistency and thickness inherent in reinforced plastic materials, hole patterns have not been practical to inspect and control as the holes are being produced. Use of an intermittent scanning beam in cooperation with a separate electron beam for drilling has been described in U.S. Pat. No. 3,192,318-Schleich et al., patented June 29, 1965. Such a method and apparatus employs a means to deflect the scanning beam over a master drawing with the video pulses supplied by the scanning beam controlling the intensity of the electron beam impinging on the workpiece. However, such a method employing intermittent inspection after a series of holes have been generated does not provide the opportunity to correct improper positioning of holes as they are being generated. In addition, a separate scanning beam is provided to light the work area.

SUMMARY OF THE INVENTION

It is a principal object of the present invention to provide a method for inspecting and controlling the positions of holes in a surface of a workpiece as they are being generated by a high energy narrow beam.

Another object is to provide improved apparatus for conducting such a method including means to adjust the position of the high energy beam.

These and other objects and advantages will be more fully understood from the following detailed description, drawings and examples, all of which are intended to be typical of rather than in any way limiting upon the scope of the present invention.

Briefly, the method of the present invention for inspecting and controlling the position of a plurality of holes made by a high energy beam, such as a laser, through a surface of a member comprises determining the relative positions of the generated holes using a light sensing means responsive to light flashes resulting from material of the sheet member vaporizing as the high energy or laser beam produces the holes, each light flash illuminating the actual hole pattern in the vicinity of the hole from which the flash is generated. Such actual hole pattern is compared, as the holes are being generated, with a preselected hole pattern and the position of the beam is adjusted, if required to correct undesirable error in the actual hole pattern.

The apparatus of the present invention to conduct such a method includes light sensing means responsive to a light flash produced by the high energy or laser beam when vaporizing material of the sheet member in making holes. The light sensing means observes the relative position of the holes being produced, because the light flash illuminates the actual hole pattern in the vicinity of the holes being made. The apparatus also includes a hole pattern comparison means for comparing signals of the actual hole pattern from the light sensing means with a preselected hole pattern. Included are means to transmit signals between the light sensing means and the comparison means and means to adjust the position of the high energy beam if required to correct undesirable error in the actual hole pattern.

BRIEF DESCRIPTION OF THE DRAWING

FIG. 1 is a diagrammatic representation of one form of the apparatus of the present invention; and FIG. 2 is a diagrammatic side view of the drum portion of FIG. 1 practicing the method of the present invention.

DESCRIPTION OF THE PREFERRED EMBODIMENTS

One form of an acoustical panel for a gas turbine engine includes an internal or intermediate sheet or "septum" in the form of a fiberglass laminate including an epoxy resin as a binder. For sound attenuation purposes, it was desired to produce 0.005" diameter holes with a spacing of about 0.02" between holes. Thus, a very small, precise and accurately controlled method and apparatus for drilling holes was required.

Prior to the present invention, production of such small diameter holes in the above-described fiberglass septum material utilized an electron beam machine including an electron beam gun and vacuum work chamber. However, such electron beam method was found to result in oxidation of the epoxy resin to the extent that the fiberglass material was not functional as a laminate. In addition, the method and apparatus were costly.

In an investigation using a $CO_2$ laser, it was shown that 0.005" diameter holes can be drilled through the fiberglass material at a very rapid rate, for example approximately 400 holes per second. In addition, it was observed that as the laser beam contacted the material in an intensity sufficient to generate a hole, it vaporized the material of the sheet, producing a brief flash of light. The present invention uses such a flash of light in cooperation with light sensing means to observe the hole pattern, compare it with a standard and make corrections in the pattern, if required.

The present invention will be more readily understood from reference to the drawings and its associated description. Referring to the diagrammatic FIG. 1, shown is one form of the apparatus of the present invention for making, inspecting and controlling the position of a plurality of holes through a surface of a member, when such member is a sheet or panel-type member, which can be flat or shaped (as arcuate), hereinafter called a sheet member for convenience. Such apparatus includes a member carrier such as drum 10 on which is mounted sheet member 12 about the periphery of the drum. Drum 10 is rotated about its longitudinal axis, for example using a pulley 14, belt 16 and electric motor 18, for example a variable speed motor to adjust the rotational rate of the drum and the sheet member 12 which it carries. The apparatus includes traversing means 20 to move the drum, and its associated rotational means, along the axis of the drum as shown in FIG. 1. A traversing screw drive can be used for such a purpose. A laser source 22, one example of which is a $CO_2$ laser, commercially available from a variety of sources, for example a Coherent Everlase 525 laser source, of intensity sufficient to vaporize material of the sheet member upon contact, directs a laser beam, and preferably a pair of laser beams 24 and 26, toward and preferably substantially perpendicular to surface 28 of sheet member 12 if a circular hole is desired. The position of at least one of the laser beams 24 and 26 is adjustable, for example using a servo-mechanism shown at 30, associated with laser beam 26.

Connected with drum 10 is a pulse signal means 32 in signal contact with laser source 22 to signal to the laser source the desired pulse rate of the laser beams as a function of rotation of sheet member surface 28 with respect to laser beams 24 and 26. Commercially available pulse signal means, identified as rotary encoders, can be carried on the axial shaft of drum 10 for rotation therewith. In this way, the pulse rate signaled to the laser means 22 is varied as a function of shaft rotation. Laser beams 24 and 26 are spaced one from the other and in respect to sheet member surface 28 so that coordination of their pulse rate with rotation and axial movement of the sheet member surface provides a desired pattern. Although a pair of laser beams 24 and 26 are shown in this embodiment, it will be understood by those skilled in the art that a single laser beam or a number of laser beams greater than two can be used in accordance with the present invention. Also, as is well known in the art, the pulse length (duration) and intensity can be varied; and other types of lasers can be used to remove the material.

As was mentioned before, as the laser beam of material removal intensity strikes the sheet member surface 28 to remove material, such as to drill a hole in or through the member, material of the member is vaporized producing a brief flash which illuminates not only the hole being drilled but also adjacent holes. Light sensing means, such as video camera 34, is directed at that portion of member surface 28 on which the laser beams are striking. It is convenient that the laser beams and light sensing means be in a fixed position and stationary as the sheet member surface 28 is rotated and traversed as described above. A signal generated from light sensing means 34 is transmitted to a hole pattern comparison means, such as a cathode ray tube or television screen 36, for comparison of the actual hole pattern being generated with a preselected hole pattern. For example, a transparency 38, as a standard for the hole pattern, can be disposed on the tube screen of comparison means 36 for visual observation by an operator. If the operator observes an undesirable error between the actual hole pattern and the standard, adjustment can be made such as manually through servounit control 40 which cooperates with servo mechanism 30 to move laser beam 26 in order to correct an error. As was mentioned above, one or more of a plurality of laser beams can be variable in position in order to correct such error. It should be understood that although this embodiment includes visual comparison and subsequent manual modification of laser beam position, the present invention contemplates a variety of light sensing, comparison and position correction means including fiber optics, photometric sensing, electronic signal comparison automatic position change, etc.

Practice of the method of the present invention for making, inspecting and controlling the position of a plurality of holes through the surface of a member thus comprises directing at the member surface at least one, and preferably a plurality of, laser beams, such as 24 and 26 in FIG. 1. Such beams are pulsing at a predetermined rate and duration as a function of the type and thickness of material of the workpiece and movement of the workpiece with respect to the laser beams. Such beams are of an intensity sufficient to vaporize material of the member, resulting in a light flash. When a plurality of beams are used, they are spaced apart one from the other to provide a preselected pattern. Concurrently, relative movement is provided between the workpiece member and the laser beams along a preselected path. Thus the pulsing of the laser beams and the relative movement between the laser beams and the workpiece member are coordinated to generate a uniform, preselected hole pattern on the member surface.

According to the present invention, the relative position of the generated holes are determined by a light sensing means responsive to light flashes resulting from material of the sheet member vaporizing as the laser beams produce the holes. Each light flash illuminates the actual hole pattern in the vicinity of the holes at which the flash is generated. The light sensing means, such as video camera 34 in FIG. 1, transmits the signal generated by the flash to a comparison means 36 such as a cathode ray tube video display screen, etc., where comparison is made of the actual hole pattern with a preselected hole pattern. Then, if required to correct undesirable error, adjustment of the position of at least one of the laser beams is made.

FIG. 2 is a diagrammatic representation of drum 10 and sheet 28 with a typical hole pattern, greatly enlarged and spaced, to show the relative positions and the spiral direction of orientation of the drilled holes. Such orientation results from rotation of the workpiece such as sheet 12 on drum 10, as it is moved by traversing means as represented by arrow 20. FIG. 2 shows a typical hole pattern which can be generated conveniently using a pair of laser beams such as 24 and 26 in FIG. 1. In one embodiment, video camera 34 can be aimed at the hole being generated by laser beam 26, the flash from which illuminates that hole, which appears in stop-motion and is in focus. However, if a lens of a relatively long focal length is used, the holes generated by laser beams 24 can be made to appear slightly out of focus and be presented essentially as a line in order to determine the relative position of each hole generated by laser beam 26 to the line of holes generated by laser beam 24. An appropriate lens can be used to provide the entire field of view in focus and stop-motion.

In a particular example, a sheet of fiberglass cloth laminate of about 0.015" thick, impregnated with epoxy resin in the prepreg condition, was mounted as sheet member 12 on drum 10 for the drilling of holes of about 0.005" diameter. Because of irregularities of as much as 0.005–0.010" in the fiberglass during its manufacture, the surface is not uniform. This can translate into loss of desired pattern and hence the need for real-time sensing of the pattern. As has been mentioned before, the present invention can sense either or both or all of the rows being generated, depending on the equipment selected. In this particular example, the holes from the second laser beam 26 were sensed. Each of the pair of laser beams 24 and 26 were flashed at about 250 times per second, out of phase. Because of the irregularities in the surface of the material of the sheet workpiece, error was introduced and was observed on a cathode ray tube in comparison with a standard which was superimposed upon the face of the tube. The operator of the apparatus then corrected laser beam 26 to remove undesirable error in the hole pattern. During operation, each of the holes generated by laser beam 26 was observed to be in a stopped or unmoving position because of the strobe effect of the flash resulting from vaporization of the workpiece material.

In the apparatus of the present invention, it is convenient to use a ribbed drum around which a sheet member is positioned, to avoid excessive contact between the laser beams and drum. The pulse signal means was a rotary optical shaft encoder which was slipped on the shaft. The encoder provided an infrared signal through translucent sections which alternate with opaque sections. In this type of apparatus, a phototransistor picks up the infrared signal, dependent on the shaft rotation, and sends the signal to a pulse board of the laser source which translates such signal to pulse rate of the laser.

Thus the present invention provides a method and apparatus for generating accurately a plurality of holes in a surface of a workpiece. Such holes can project through or partly into the workpiece material, for example, depending upon the intensity or duration of the energy source. As used herein, the term "hole" is used to represent any shape of material removed from or through a workpiece. The present invention contemplates vaporization of such workpiece material to provide a stroboscopic effect which can be used to determine the relative positions of the generated holes. Error in such position can be corrected through comparison and adjustment of the energy beams.

Although the embodiments discussed here involve a rotating workpiece, it should be understood that the present invention contemplates any appropriate relative movement between a workpiece surface and a high energy material vaporization beam, for example a traversing, relatively flat table, appropriately adjustable and translatable, to create the hole pattern desired and to correct errors in the hole pattern. Thus, although the present invention has been described in connection with specific embodiments and examples, it will be understood by those skilled in the art that the present invention is capable of variations and modifications within its scope.

What is claimed is:

1. In a method for making a plurality of holes through a surface of a member in which the holes are generated by an energy beam sufficient to vaporize material of the workpiece and create a light flash, the method of inspecting and controlling the position of such plurality of holes comprising:

determining the relative position of the generated holes by a light sensing means responsive to the light flash resulting from material of the member vaporizing as the energy beam produces each hole, each light flash illuminating an actual hole pattern in the vicinity of the hole from which the flash is generated;

comparing the actual hole pattern with a preselected hole pattern; and then adjusting the position of the energy beam if required to correct undesirable error in the actual hole pattern.

2. A method as in claim 1 for making, inspecting and controlling the position of a plurality of holes through a surface of a sheet member comprising the steps of:

directing at the sheet member surface a plurality of laser beams which are pulsing at a predetermined rate and duration and which are of intensity sufficient to vaporize material of the sheet member and create light flashes, the beams being spaced apart one from the other, while providing relative movement between the sheet member and the laser beams along a preselected path;

the pulsing of the laser beams and the relative movement between the laser beams and the sheet member being coordinated to generate a uniform, preselected hole pattern on the sheet member surface;

determining the relative positions of the generated holes by a light sensing means responsive to the light flashes resulting from material of the sheet member vaporizing as the laser beams produce holes, each light flash illuminating the actual hole pattern in the vicinity of the hole from which the flash is generated;

comparing the actual hole pattern with a preselected hole pattern; and then adjusting the position of at least one of the laser beams if required to correct undesirable error in the actual hole pattern.

3. The method of claim 2 in which:

the sheet member is disposed on the periphery of a cylindrical carrier; and the relative movement between the sheet member and the laser beams is provided by rotating the cylindrical carrier about its axis.

4. The method of claim 3 in which a spiral hole pattern is generated by translating the cylindrical carrier along its axis as it rotates.

5. The method of claim 1 in which the light sensing means is a television camera; and the comparing of the actual hole pattern with the preselected hole pattern is conducted by transmitting a signal from the television camera to a video display screen and disposing on the video screen the preselected hole pattern.

6. The method as in claim 2 for rapidly making, inspecting and controlling the position of a plurality of small holes through a surface of a non-metallic sheet member comprising the steps of:

disposing the sheet member on the periphery of a cylindrical carrier;

rotating the carrier and the sheet member about the carrier longitudinal axis at a substantially constant rate, while translating the carrier and the sheet member along the longitudinal axis at a substantially constant rate as it rotates;

directing at the rotating, translating sheet member surface a pair of laser beams which are pulsing at a predetermined rate and duration and which are of intensity sufficient to vaporize material of the sheet member to produce a light flash, the pair of beams being spaced apart from one another to generate a pair of spirally aligned holes in the sheet member surface;

determining the relative positions of the generated holes by directing a television camera at the member surface at which the laser beams are directed to sense the light flash resulting from material of the sheet member vaporizing as each laser beam produces a hole, the light flash illuminating the actual hole pattern in the vicinity of the generated hole;

transmitting a signal from the television camera to a video screen;

comparing the actual hole pattern with a preselected hole pattern by disposing on the video screen the preselected hole pattern; and then, adjusting the position of at least one of the laser beams if required to correct undesirable error in the actual hole pattern.

7. In apparatus for making a plurality of holes through a surface of a member, using a high energy beam which vaporizes material of the member to produce a light flash, an apparatus for inspecting and controlling the position of the plurality of holes comprising:

light sensing means responsive to the light flash produced by the energy beam when vaporizing material of the member in making a hole, to observe the relative position of the hole being produced with respect to adjacent holes and to generate a signal, the light flash illuminating the actual hole pattern in the vicinity of the hole being made;

a hole pattern comparison means comparing the signal of the actual hole pattern from the light sensing means with a preselected hole pattern;

means to transmit the signal between the light sensing means and the hole pattern comparison means; and means to adjust the position of the high energy beam, if required to correct undesirable error in the actual hole pattern.

8. Apparatus as in claim 7 for making, inspecting and controlling the position of a plurality of holes through a surface of a sheet member, comprising:

a sheet member carrier;

means to hold the sheet member on the carrier;

at least one laser source providing a plurality of laser beams each of intensity sufficient to vaporize material of the sheet member thereby producing a light flash, the beams being spaced apart one from another and directed at the sheet member surface;

means to provide preselected relative movement between the carrier and the laser beams;

means to pulse the laser beams at a preselected rate;

light sensing means responsive to the light flash produced by the laser beam when vaporizing material of the sheet member in making a hole, to observe the relative position of the hole being produced with respect to adjacent holes, and to generate a signal, the light flash illuminating the actual hole pattern in the vicinity of the hole being made;

a hole pattern comparison means comparing the signal of the actual hole pattern from the light sensing means with a preselected hole pattern;

means to transmit the signal between the light sensing means and the hole pattern comparison means; and means to adjust the position of at least one of the laser beams if required to correct undesirable error and the actual hole pattern.

* * * * *